J. DESMOND.
ART OF MAKING BUTTER.
APPLICATION FILED SEPT. 24, 1910.
1,007,773.
Patented Nov. 7, 1911.
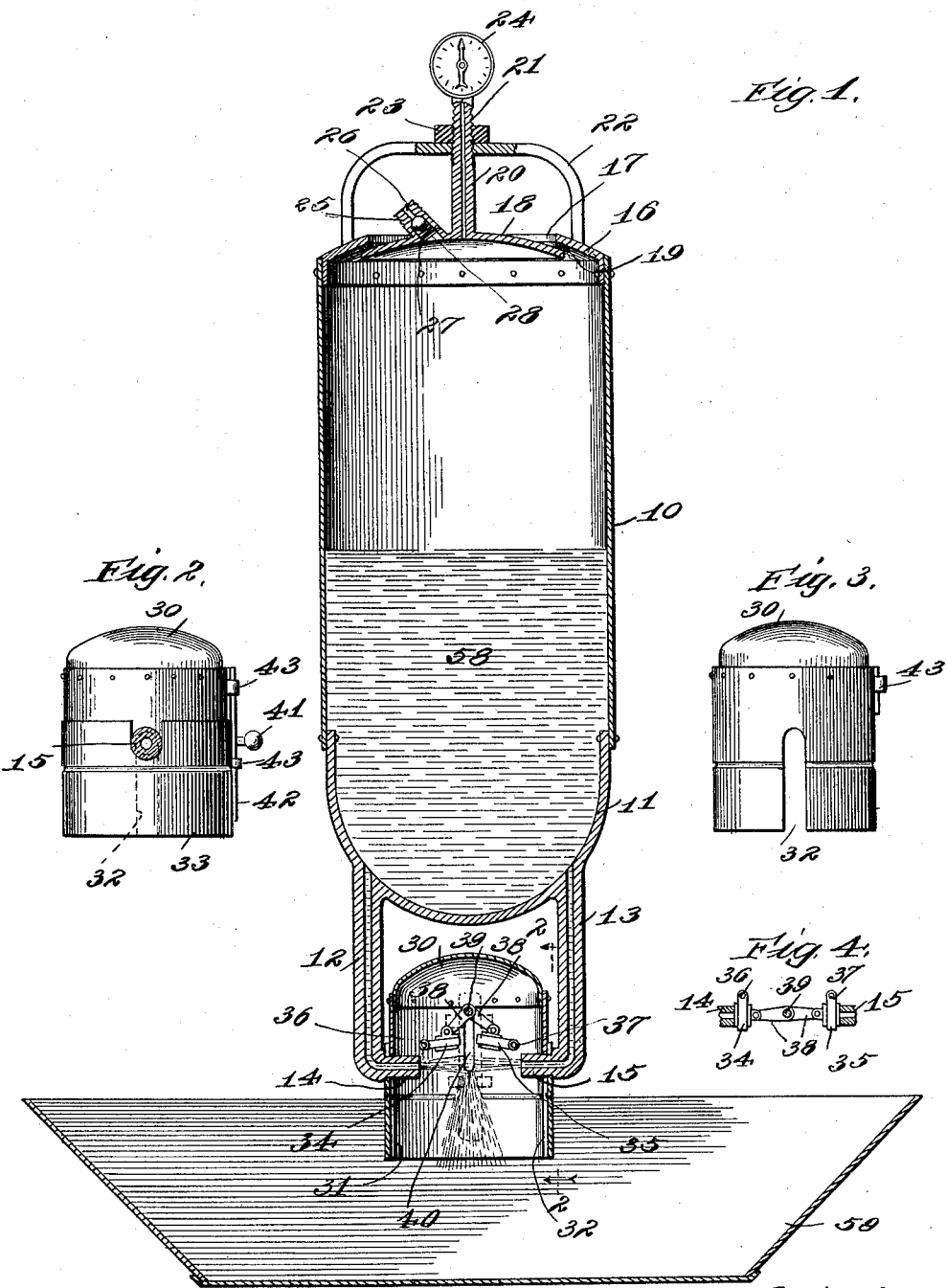

UNITED STATES PATENT OFFICE.

JOHN DESMOND, OF CHICAGO, ILLINOIS, ASSIGNOR TO WILLIAM S. POTWIN, OF CHICAGO, ILLINOIS.

ART OF MAKING BUTTER.

1,007,773. Specification of Letters Patent. Patented Nov. 7, 1911.

Application filed September 24, 1910. Serial No. 583,560.

*To all whom it may concern:*

Be it known that I, JOHN DESMOND, a citizen of the United States, residing at Chicago, in the county of Cook and State of Illinois, have invented certain new and useful Improvements in the Art of Making Butter, of which the following is a specification.

My invention relates to improvements in the art of making butter and has for one of its objects to provide means for projecting relatively small quantities, at a time, of a mass of cream in streams one against the other, or against a relatively stationary body, with sufficient force to fracture or break up the butter cells contained in the cream.

I have discovered that by confining a body of cream within a receptacle and subjecting the mass to a considerable pressure, and then permitting the cream to escape in a small fine stream, under pressure, and causing it to impinge upon a relatively firm body, or hard substance, as the bottom of a pan, or the like, or direct one fine stream of cream against another, from the same or another like receptacle, that the impact is sufficient to break up or rupture the butter sacks or cells and freely release all of the butter particles contained in the cream. Pressure may be applied to the body of the cream by confining it in an air tight receptacle and pumping air into the receptacle above the cream until the desired pressure is attained, or a weighted or spring-pressed piston may be superposed on the cream in a cylinder, which will have sufficient power to produce the desired pressure; the weight of the piston or the tension of the spring operating to impel the piston toward the cream to maintain the pressure as the cylinder is emptied.

In the specific embodiment illustrated, Figure 1 shows a vertical section of a system adapted for pneumatic operation; Fig. 2 is a section on line 2—2 of Fig. 1, showing the hoods for the nozzles from which the streams of cream issue; Fig. 3 is a view of the hood before its application to the device; Fig. 4 is a view showing the closures for the nozzles with a toggle-joint arrangement for holding them in place.

In all of the views, similar reference characters indicate corresponding parts.

Referring specifically to Fig. 1, 10 is a cylinder or body part of the device, to the lower end of which a cup-shaped casting 11 provided with pipes 12 and 13, having their lower free ends inturned toward each other to form nozzles 14 and 15, is attached to the cylinder 10. To the upper end of the cylinder 10 is attached a casting 16 provided with an oblong hand hole, 17. A closure 18 is held in place against a packing ring, 19, by means of a perforate stem, 20, screw-threaded as at 21. Around the perforate stem is a four-footed crab, 22, which has bearing upon the head 16. The stem 20 carries a nut 23 which may be screwed down upon the upper surface of the crab 22 to cause the closure 18 to bear firmly against the gasket 19 to form a pressure-tight joint.

To the upper end of the stem 20 is attached a pressure gage 24 to indicate the pressure within the receptacle. A stem 25 is perforated, as at 26, and is provided with a ball valve 27 spring-pressed to its seat by spring 28. The stem 25 is screw-threaded exteriorly and is a means by which the receptacle may be attached to a source of compressed air whereby it may be charged with air, the ball acting as a check valve to hold the pressure within the receptacle.

At the lower end of the device is a hood 30 adapted to surround the nozzles 14 and 15 for confining the spray as the cream issues from the receptacle under pressure through the said nozzles. The hood is slotted, as at 31 and 32, in order that it may be slipped over the ends of the nozzles 14 and 15. A cylinder 33 is provided to slip over the lower end of the hood to close the slots 31 and 32 below the respective nozzles. Closures 34 and 35 for the nozzles 14 and 15 respectively are pivoted to the hood as at 36 and 37 respectively. The closures are mounted on arms that are pivoted together by means of a toggle-link, 38, the point 39 where the links of the toggle join being adapted to be slid vertically in the slot 40 by means of the knob 41 which is attached to the rod, 42, guided by perforate lugs, 43, secured to the outside of the hood. When the toggle is in the position shown in Fig. 4, the closures 34 and 35 are firmly placed and held over the ends of the nozzles 14 and 15 respectively. When the knob 14 is raised, as in Fig. 1, the toggle is broken and the closures are moved free of the nozzles to the positions shown in Fig. 1, widely opening the nozzles and permitting the cream contained in the receptacle to be ejected in two small streams directed against each other.

When the device is properly charged with cream, sterilized air is admitted through the valve 26 until pressure is shown in the gage to be in the neighborhood of 150 pounds to the sq. in. The nozzles are then opened, in the manner described, and small streams of cream under pressure will issue from the nozzles and be directed toward and against each other, so that the particles of the cream of one steam will impinge with violent force open the particles of the opposing stream; the impact rupturing the butter sacks in the cream and liberating the butter. Cream 58 is placed in the receptacle as shown in Figs. 1 and 5, and pressure may be applied to the body of the cream either by pumping air into the receptacle above the cream, as in the first instance, or by means of the spring impelled piston, the object being in each case finally to impel the cream to pass out of the receptacle under considerable pressure so as to produce violent agitation of small quantities of the cream sufficient to break up the cells containing the butter.

59 is a pan for catching the cream.

Many variations may be made from the precise structure exemplified, and the modification shown, to accomplish the objects of my invention without departing from the spirit and scope of the appended claims.

Having thus described my invention, what I claim and desire to secure by Letters Patent of the United States, is:

1. In a device of the character described, the combination with a closed fluid reservoir providing a closable means for filling, of two pipes spaced apart connected with said reservoir and having openings in their free ends, said openings facing each other, a removable hood for inclosing said openings, a closure for each of said openings, and means for simultaneously operating said closures.

2. In a device of the character described, a reservoir comprising a tank having a filling opening, an insertible plate internally seated for closing said opening, a spring seated valve carried by said plate, a hollow central screw-threaded stem projecting from said plate to provide a pressure gage attachment, a crab surrounding said stem, and a nut on said stem for holding said plate on its seat.

In testimony whereof I hereunto set my hand in the presence of two witnesses.

JOHN DESMOND.

In the presence of—
W. SAM ALLEN,
MARY F. ALLEN.

---

Copies of this patent may be obtained for five cents each, by addressing the "Commissioner of Patents, Washington, D. C."